US011548741B2

(12) United States Patent
Chintalapalli Patta et al.

(10) Patent No.: US 11,548,741 B2
(45) Date of Patent: Jan. 10, 2023

(54) APPARATUS AND METHOD FOR AUTOMATED OBJECTS MANIPULATION TO AND FROM PALLETS

(71) Applicant: Tata Consultancy Services Limited, Mumbai (IN)

(72) Inventors: Venkat Raju Chintalapalli Patta, Bangalore (IN); Venkatesh Prasad Bangalore Srinivas, Bangalore (IN); Swagat Kumar, Bangalore (IN); Rajesh Sinha, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 161 days.

(21) Appl. No.: 17/088,293

(22) Filed: Nov. 3, 2020

(65) Prior Publication Data
US 2021/0300694 A1    Sep. 30, 2021

(30) Foreign Application Priority Data
Mar. 27, 2020    (IN) .............................. 202021013521

(51) Int. Cl.
*B65G 65/00*    (2006.01)
*B25J 9/16*    (2006.01)
(Continued)

(52) U.S. Cl.
CPC .......... *B65G 65/005* (2013.01); *B25J 9/1664* (2013.01); *B25J 9/1687* (2013.01); *B65G 57/20* (2013.01); *B65G 61/00* (2013.01)

(58) Field of Classification Search
CPC ...... B65G 61/00; B65G 57/20; B65G 65/005; B25J 9/1687
See application file for complete search history.

(56) References Cited

U.S. PATENT DOCUMENTS 8,919,360 B1* 12/2014 Ransley .................... B08B 3/02
134/198
2020/0078938 A1* 3/2020 Bradski .................. G06V 10/60

FOREIGN PATENT DOCUMENTS

CA      2793834 C      9/2011
CN    104589163 A      5/2015
(Continued)

*Primary Examiner* — Saul Rodriguez
*Assistant Examiner* — Willie Berry, Jr.
(74) *Attorney, Agent, or Firm* — Finnegan, Henderson, Farabow, Garrett & Dunner LLP

(57) ABSTRACT

Conventionally, loading and unloading pallets occurred in a factory like environment, wherein traditional systems were used for stacking pallets vertically for retrieval thereof. However, these pallets arrive from a roller conveyer and such set-ups are purely based on the concept of storage purpose and lack in palletizing and depalletizing in effective manner. Embodiments of the present disclosure provide pallet loading and unloading apparatus for automated objects manipulation, wherein pallet(s) from a forklift jack arrives on a linear slider assembly for movement of pallet from loading area to manipulating area using two double-sided cylinders associated thereof. Rollers comprised in apparatus provide flexibility to linear slider to slide freely on top. Manipulator performs palletizing and depalletizing as applicable. During depalletizing, empty pallet is slide down using actuator(s) and guided pins and pushed back to bottom rollers which is below a L-channel and is pushed out towards bottom ramp at pallet exit area.

11 Claims, 27 Drawing Sheets

(51) Int. Cl.
*B65G 57/20* (2006.01)
*B65G 61/00* (2006.01)

(56) References Cited

FOREIGN PATENT DOCUMENTS

CN 106346299 B 7/2018
EP 0664265 B1 8/1999
WO WO2018148536 A1 8/2018

\* cited by examiner

APPARATUS AND METHOD FOR AUTOMATED OBJECTS MANIPULATION TO AND FROM PALLETS

PRIORITY CLAIM

This U.S. patent application claims priority under 35 U.S.C. § 119 to: India Application No. 202021013521, filed on Mar. 27, 2020. The entire contents of the aforementioned application are incorporated herein by reference.

TECHNICAL FIELD

The disclosure herein generally relates to objects manipulation techniques, and, more particularly, to apparatus and method for automated objects manipulation to and from pallets.

BACKGROUND

Current pallet loading and unloading is a manual process and involves huge manpower and time. Though there exist pallet loading and unloading systems, these conventional setups are used in a factory like environment. More specifically, these conventional systems are used for stacking pallets vertically for retrieval thereof. However, these pallets arrive from a roller conveyer and such set-ups are purely based on the concept of storage purpose and do not provide an end-to-end solution (e.g., depalletizing and loose loading or loose loading and palletizing). Therefore, conventional systems lack in providing options for palletizing and depalletizing.

SUMMARY

Embodiments of the present disclosure present technological improvements as solutions to one or more of the above-mentioned technical problems recognized by the inventors in conventional systems. For instance, in one aspect, there is provided an apparatus for automated objects manipulation to and from pallets. The apparatus comprises: a mobile base; a plurality of pallet receivers mounted on one end of the mobile base, wherein each of the plurality of pallet receivers are configured to accommodate a pallet; a linear slider having a first double sided piston at a first end and a second double sided piston at the second end of the linear slider, wherein a first pallet receiver accommodates a first pallet in a first area, wherein the first pallet is locked by the linear slider, the first double sided piston and the second double sided piston, wherein the linear slider is configured to slide the first pallet from the first area to a second area of a second pallet receiver such that a second pallet is configured to occupy the first area; a plurality of sensors mounted on the mobile base; and a robotic manipulator mounted on other end of the mobile base, wherein the robotic manipulator is in communication with the plurality of sensors for (i) navigating to a desired position and manipulating one or more objects placed on the first pallet and (ii) loading the manipulated one or more objects to a desired location, and wherein when the first pallet is empty, the first pallet is indexed to a bottom layer of the mobile base and the second pallet is moved to the second area, using a first piston pin of the first double sided piston and a second piston pin of the second double sided piston.

In an embodiment, the robotic manipulator is in communication with plurality of sensors for (i) navigating to a desired location and manipulating one or more objects placed inside the second pallet and (ii) loading the manipulated one or more objects to another desired location.

In an embodiment, the first end and the second end of the linear slider are opposite to each other.

In an embodiment, the apparatus is configured to dynamically move from a first position to a second position within the desired location based on space occupied by the one or more objects being manipulated.

In an embodiment, the apparatus dynamically moves from the first position to the second position by a specific length obtained from a loading planner.

In an embodiment, the first area and the second area are one of (i) a pallet loading or unloading area or (ii) an object manipulating area comprised in a pallet.

In another aspect, there is provided a method for manipulating objects by a pallet loading and unloading apparatus. The method comprises: receiving, by a first pallet receiver of the pallet loading and unloading apparatus, a first pallet in a first area. locking the first pallet using (i) a first double sided piston positioned at a first end of the linear slider of the pallet loading and unloading apparatus and (ii) a second double sided piston positioned at the second end of the linear slider; sliding, via the linear slider, the first pallet from the first area to a second area of a second pallet receiver; and manipulating, via a robotic manipulator of the pallet loading and unloading apparatus, one or more objects placed on the first pallet for loading the manipulated one or more objects to a desired location.

In an embodiment, the one or more objects are manipulated by the robotic manipulator of the pallet loading and unloading apparatus based on navigation information and manipulating information obtained from a plurality of sensors mounted on the pallet loading and unloading apparatus.

In an embodiment, when the first pallet is slid (or slided) to the second area, the first pallet receiver is configured to accommodate a second pallet in the first area.

In an embodiment, the robotic manipulator is in communication with plurality of sensors for (i) navigating to a desired location and manipulating one or more objects placed inside the second pallet and (ii) loading the manipulated one or more objects to a desired location.

The method may further comprise upon determining that the first pallet is empty, automatically indexing the first pallet to a bottom layer of the mobile base and sliding the second pallet from the first area to the second area, using a first piston pin of the first double sided piston and a second piston pin of the second double sided piston.

The method may further comprise dynamically moving of the pallet loading and unloading apparatus, from a first position to a second position by a specific length obtained from a loading planner, wherein the pallet loading and unloading apparatus dynamically moves from the first position to the second position within the desired location based on space occupied by the one or more objects being manipulated.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
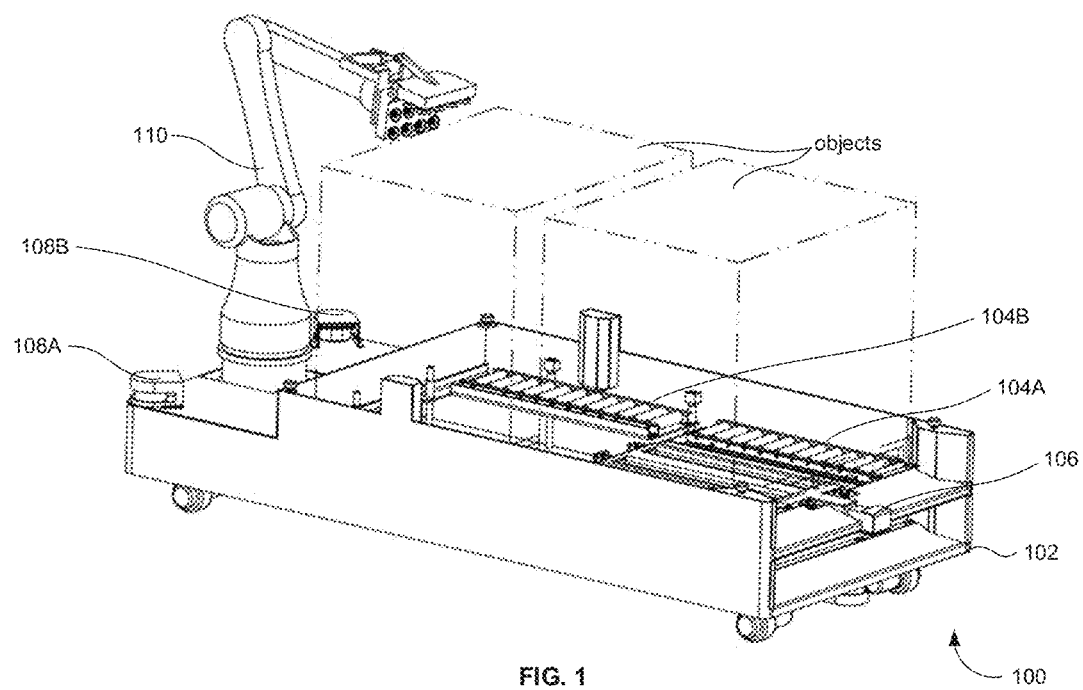
FIG. 1 depicts a pallet loader and unloader apparatus, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Current pallet loading and unloading is a manual process and involves huge manpower and time. Though there exist pallet loading and unloading systems, these conventional setups are used in a factory like environment. More specifically, these conventional systems are used for stacking pallets vertically for retrieval thereof. However, these pallets arrive from a roller conveyer and such set-ups are purely based on the concept of storage purpose. Therefore, conventional systems lack in providing options for palletizing and depalletizing. Embodiments of the present disclosure provide pallet loading and unloading apparatus for automated objects manipulation to and from pallets. More specifically, the pallet loading and unloading apparatus comprises of a mobile base with drive wheels wherein a manipulator is mounted on top of it. The apparatus comprises three areas, namely, loading area, manipulating area, and pallet exit area. The loading area refers to an area where a forklift or some other vehicle brings full palette and load it on a pallet receiver that serves as a roller platform. The manipulating area refers to an area where objects from a full pallet are manipulated and moved from the manipulating area to a desired location. The pallet exit area refers to an area where once the pallet is empty the empty pallet is moved down to a bottom layer of the mobile base and pushed toward the pallet exit area. The apparatus of the present disclosure achieves the above features by incorporating a linear slider and double sided pistons which lock the received palette and slide it to the robot pick section (manipulating area) in which the manipulator gets access to the palette to operate. Once the sliding of the palette is done, the double-sided pistons release and slide back to the loading area to handle another palette.

Referring now to the drawings, and more particularly to FIGS. 1 through 9, where similar reference characters denote corresponding features consistently throughout the figures, there are shown preferred embodiments and these embodiments are described in the context of the following exemplary system and/or method.

Reference numerals of one or more components of the gripper apparatus as depicted in the FIGS. 1 through 9 are provided in Table 1 below for ease of description:

TABLE 1

| Sl. No | Component | Numeral reference |
|---|---|---|
| 1 | Pallet loading and unloading apparatus | 100 |
| 2 | Mobile base | 102 |
| 3 | Plurality of pallet receivers | 104A-N |
| 4 | Linear slider | 106 |
| 5 | Plurality of sensors | 108A-B |
| 6 | Manipulator | 110 |
| 7 | Side covers of manipulator | 112A-B |
| 8 | Base plate | 114 |
| 9 | Top ramp | 116A |
| 10 | Bottom ramp | 116B |
| 11 | counterweight | 118 |
| 12 | sensor | 120 |
| 13 | Drive wheels | 122A-D |
| 14 | Control box | 124 |
| 15 | C-channel | 126 |
| 16 | Rollers | 128 |
| 17 | L-channel | 130 |
| 18 | Dual indexing plate | 132 |
| 19 | Plurality of extrusions | 134 |
| 20 | Slider plate | 136 |
| 21 | Slider rail | 138 |
| 22 | Double sided cylinders/double sided pistons | 140A-B |
| 23 | Actuators | 142A-B |
| 24 | Actuator covers | 144A-B |
| 25 | Guide rods | 146A-N |
| 26 | Manipulator base | 148 |
| 27 | Top cover | 150 |
| 28 | Grasping component | 152 |
| 29 | End stopper | 154 |

Figure 2A:
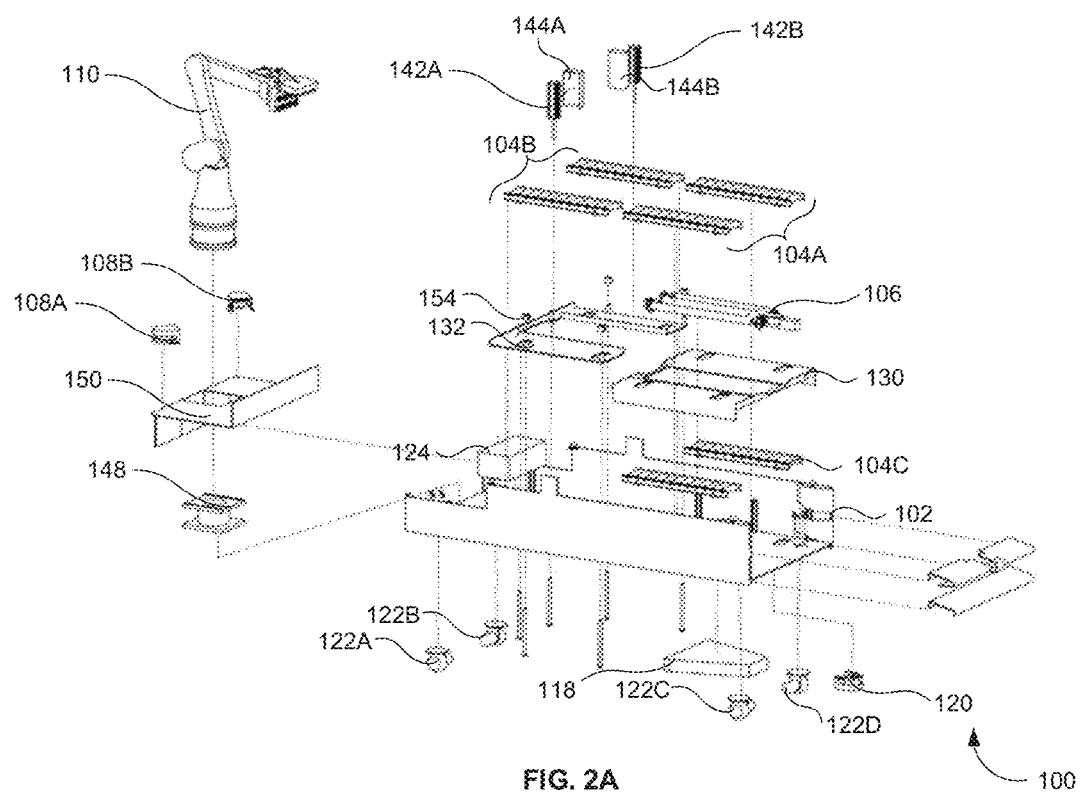
FIGS. 2A through 2C, depict an exploded view of the apparatus of FIG. 1, in accordance with an embodiment of the present disclosure.
Figure 2B:
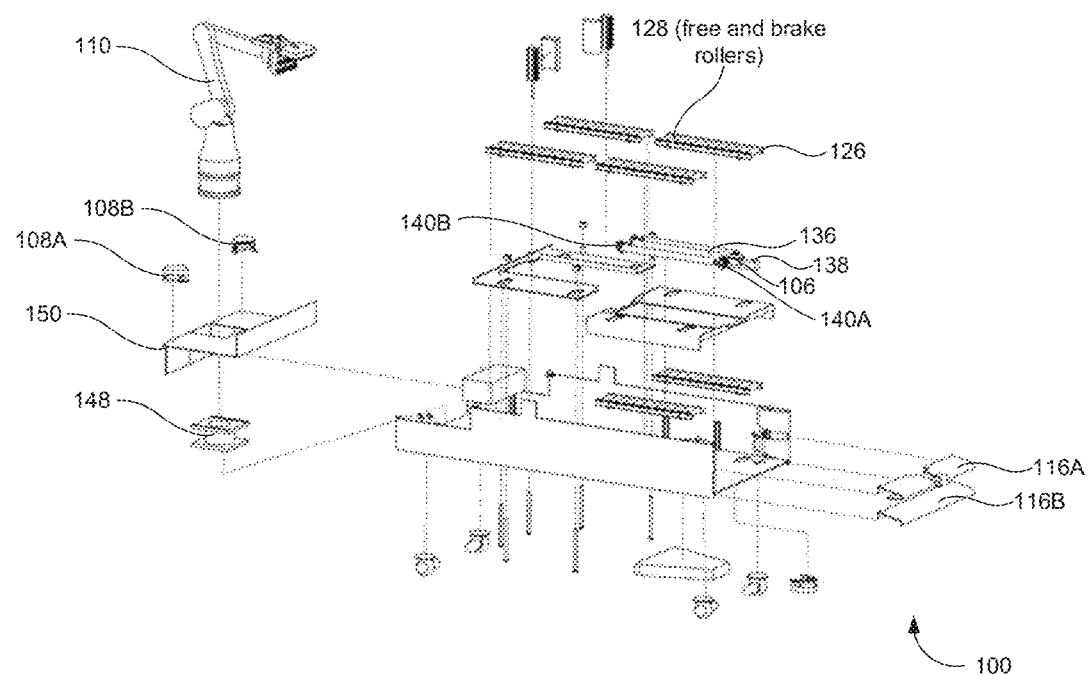
Figure 2C:
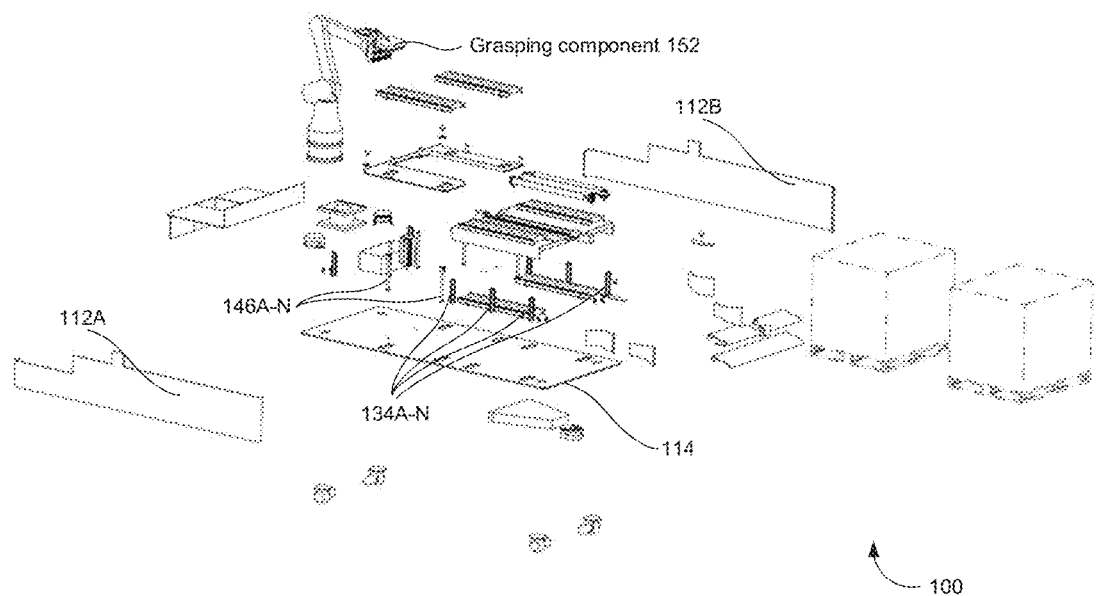

FIG. 1 depicts a pallet loader and unloader apparatus 100, in accordance with an embodiment of the present disclosure. In the present disclosure, the pallet loader and unloader apparatus 100 may also be referred as 'apparatus' or 'automated palette to dead pile loading/unloading system' and may be interchangeably used hereinafter. The apparatus 100 includes a mobile base 102 (also referred as 'chassis' may be interchangeably used hereinafter), a plurality of pallet receivers 104A-N, a linear slider 106, a plurality of sensors 108A-N, and a manipulator 110 (also referred as 'robot manipulator' and may be interchangeably used hereinafter). The mobile base 102 is configured to accommodate the plurality of pallet receivers 104A-N, the linear slider 106, the plurality of sensors 108, and the manipulator 110 at the top side of it. At the bottom of the mobile base 102 are a plurality of drive wheels that make the base 102 mobile and compact in design and is further capable of moving from one location to another location. Each of the plurality of pallet receivers 104A-N serve as 'a roller platform' or 'rails' and may be interchangeably used hereinafter. Each of the plurality of pallet receivers 104A-N are configured to accommodate a pallet. The pallet may comprise one or more objects that are grasped for manipulation and for moving the grasped objects from one area to another area. In an embodiment of the present disclosure, the one or more objects are identical in nature (e.g., identical in terms of size, shape, orientation, packaging and the like). In another embodiment of the present disclosure, the one or more objects may be similar or dissimilar in nature, wherein these objects may vary in size, shape, orientation, packaging and the like. The linear slider 106 comprises a first double sided piston (e.g., also referred as 'a first double sided cylinder' and may be interchangeably used herein after) at a first end and a second double sided piston (e.g., also referred as 'a second double sided cylinder' and may be interchangeably used herein after) at the second end of the linear slider 106. The first and second double sided pistons (e.g., the first and second double sided cylinders) are shown in FIGS. 2A through 2C. The linear slider 106 is configured to slide, a first pallet received on a first pallet receiver in a first area, to a second area of a second pallet receiver such that a second pallet is configured to occupy the first area. The robotic manipulator 110 mounted on other end of the mobile base is in communication with the plurality of sensors 108A-N via one or more input/output interfaces (communication interfaces as known in the art). With the help of navigation information captured by the sensors 108A-N, the manipulator 110 navigates to a desired position and manipulates the one or more objects placed on the first pallet and loads the manipulated one or more objects to a desired location.

FIGS. 2A through 2C, depict an exploded view of the apparatus 100 of FIG. 1, in accordance with an embodiment of the present disclosure. The exploded view of the apparatus 100 includes the mobile base 102 wherein the plurality of pallet receivers 104A-N, the linear slider 106, the plurality of sensors 108, and the manipulator 110 are mounted on the mobile base 102. As can be depicted in the apparatus 100 of FIGS. 2A through 2C, the mobile base 102 comprises at least two side covers 112A-B and a base plate 114. The apparatus 100 further comprises a top ramp 116A and a bottom ramp 116B. The at least two side covers 112A-B and the base plate 114 are configured to accommodate the top ramp 116A and the bottom ramp 116B such that the top ramp 116A and the bottom ramp 116B serve an exit for an empty pallet. At the bottom surface of the base plate 114 of the mobile base 102, a counterweight component 118 and a sensor 120 are mounted. The counterweight 118 is provided to balance the apparatus 100 and provide stability when the apparatus 100 and the manipulator 110 is operating at a complete stretch with maximum payload. The sensor 120 is configured for providing navigation and obstacle detection and avoidance when the apparatus 100 is in driving mode. This also plays a crucial role in alignment of the apparatus 100 inside any container or any closed space wherein it covers complete 360-degree view to the apparatus 100. Another set of sensors mounted on the manipulator 110 (also referred as cobot or cobot body), are configured for object identification and 3D space estimation for pick and place operation. The base plate 114 of the mobile base 102 comprises a plurality of drive wheels 122A-N (or 122A-D and interchangeably used herein after) which may be operated by a motor, gearbox mechanism, and primarily used for driving the apparatus from one location to a desired location.

The mobile base 102 further includes a control box 124 mounted on top of it. The control box 124 comprises one or more control systems (not shown in FIGS.) for receiving information, processing thereof and communicating the processed information to external components/systems via one or more input/output interfaces (e.g., wired interface connections, wireless interface connections, or combinations thereof). The plurality of pallet receivers 104A-N comprises a C-channel 126 which accommodate a plurality of rollers (e.g., free rollers, brake rollers, and the like) 128. The plurality of rollers 128 may also be referred as 'rollers' and interchangeably used hereinafter).

The apparatus 100 further comprises a L-channel 130 and a dual indexing plate 132. The L-channel 130 is mounted on to the mobile base 102 (or chassis) and further is configured to rest on a plurality of extrusions 134A-N. The L-channel 130 is configured to accommodate/hold the linear slider 106 and C-channel 126 that holds the rollers 128. The dual Indexing plate 132 holds the rollers 128 (e.g., the free rollers) and is attached to actuators. This further holds the pallet which is slid from the front section, upon the manipulator's task completion for pick and place, and the empty pallet is indexed to the bottom section to push the pallet out of the platform. The linear slider 106 comprises of a slider plate 136, a slider rail 138 and two double ended cylinders 140A-B wherein the linear slider 106 with the help of the slider plate 136, the slider rail 138 and the two double ended cylinders 140A-B is configured to slide desired pallet back and forth in the first area and the second area. The linear slider 106 consists of the slider plate 136 which slides on the slider rail 138. The two double ended cylinders 140A-B with piston pins are fixed at each side of the slider plate 136. The whole mechanism provides an actual loading (loaded pallet) and unloading (empty pallet) of the pallets—where pallets keeps rolling on the set of rollers (e.g., the rollers 128). During the pallet loading the piston pins of the double ended cylinders 140A-B are configured to be in a first position (e.g., say retracted position) from top and extended towards bottom. When the pallet is loaded all the piston pins of the two double ended cylinders 140A-B extend and hold the pallet. During the movement of a pallet from right station to left station, piston pin(s) of the double ended cylinder (e.g., say the double ended cylinder 140A) are extended (retracted at bottom side) and the other piston pins (e.g., piston pins of the double ended cylinder 140B) are retracted (extended at bottom side), thus transferring the loaded pallet from right station to left station from to side and unloading (slides out) the empty pallet from bottom side. The entire pallet will be moved to the required position i.e. right or left depending on position of the piston of the double ended cylinders 140A-B. Since the slider plate 136 is assembled to a lead screw (not shown in FIGS.), as the lead screw rotates the slider plate 136 along with the double end cylinders 140A-B moves left or right accordingly. The L-channel 130, the dual indexing plate 132 and the linear slider 106 and its components together may form a linear slider assembly. The dual indexing plate 132 is attached with a plurality of actuators 142A-N or 142A-B which are covered by respective actuator covers 144A-B. For instance, a first actuator (e.g., an actuator 142A) is positioned/attached on/to a first side of the dual indexing plate 132 and a first actuator (e.g., an actuator 142B) is positioned/attached on/to a second side of the dual indexing plate 132. The actuators 142A-B are configured to actuate the dual indexing plate 132 for moving pallet up and down inside by taking the help of a plurality of guide rods 146A-N. The actuators 142A-B are any of a pneumatic actuator, a hydraulic actuator, etc. and are configured to actuate the dual indexing plate 132 as mentioned above. Further, the actuators 142A-B are provided a control signal and a source of energy. The control signal can be relatively low energy and may be electric voltage or current, pneumatic or hydraulic pressure, or even human power. The energy source may be an electric current, hydraulic fluid pressure, or pneumatic pressure. When it receives a control signal, an actuator responds by converting the source's energy into mechanical motion (in this case actuating the dual indexing plate 132 for moving pallet up and down inside by taking the help of a plurality of guide rods 146A-N. other functionalities of actuator as known in the art may be implemented by the present disclosure to perform the methodology described herein.

The manipulator 110 includes a manipulator base 148 (also referred as 'cobot base'), a top cover 150 having a first side and a second side and a grasping component 152. The plurality of sensors 108A-N are mounted on either side of the top cover 150 as depicted in FIGS. 2A through 2C. More specifically, for instance, a first sensor (e.g., say sensor 108A) of the plurality of sensors 108A-N may be position/mounted on the first side of the top cover 150. Similarly, the second sensor (e.g., say sensor 108B) of the plurality of sensors 108A-N may be position/mounted on the second side of the top cover 150. The grasping component 150 may comprise of a plurality of grasping fingers, a plurality of suction cups (or bellows) or a combination thereof. The objects from the pallet(s) in the second area are handled/manipulated by the manipulator 110 using the plurality of grasping fingers, a plurality of suction cups (or bellows) or a combination thereof. The manipulation of objects may depend in size, shape, orientation of the objects, in one embodiment of the present disclosure. For instance, for objects of size A (e.g., small), shape A (round) and orientation A (not applicable), the manipulator 110 may utilize say the plurality of grasping fingers for pick and placement of the objects from one position to another position the manipulator. In another example, for objects of size B (small or medium or large), shape B (e.g., square or rectangular object) and orientation B (e.g., horizontal blocks) that are different from size A, shape A and orientation A, the manipulator may utilize say the plurality of suction cups for pick and placement of the objects from one position to another position the manipulator may utilize say the plurality of grasping fingers. In yet another example, depending upon the size, shape and orientation of the objects comprised in a specific pallet, the manipulator 110 may actuate and utilize both the plurality of grasping fingers and the plurality of suction cups. In some scenarios, depending on the size, shape and orientation of the objects comprised in the pallet(s), the manipulator 110 may actuator in only (i) a subset of the plurality of fingers, (ii) a subset of suction cups, or (iii) combination of both the subsets. The apparatus 100 further comprises an end stopper 154 positioned substantially in central area at one side of the dual indexing plate 132. The end stopper 154 serves as a mechanical pin and prevents a pallet to move further when its slid on the rollers 128.

Figure 3A:
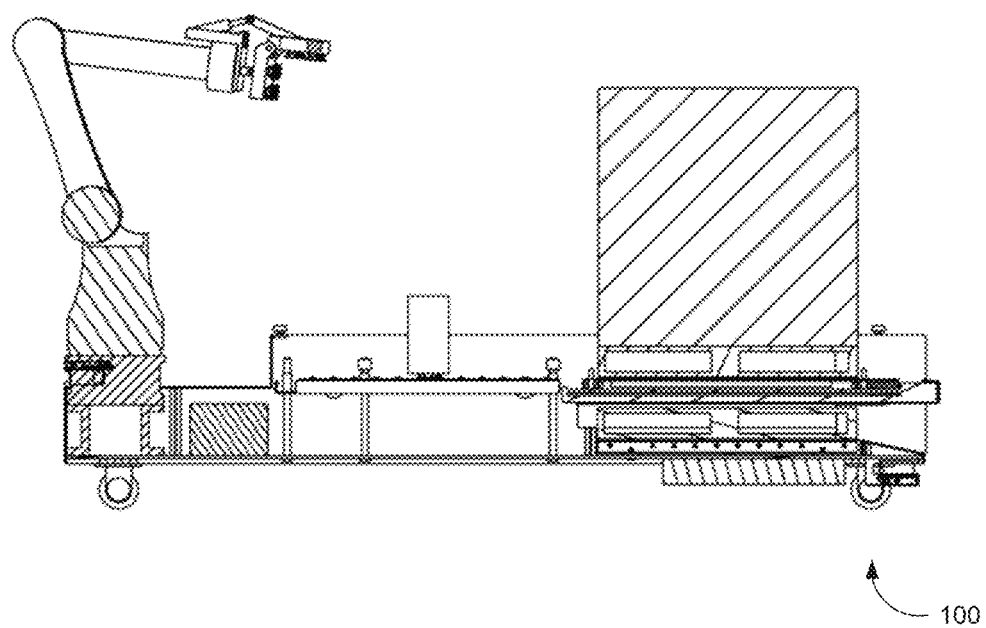
FIG. 3A depicts a full pallet loaded in top right station, and an empty pallet to be unloaded in bottom right position, in accordance with an embodiment of the present disclosure.
Figure 3B:
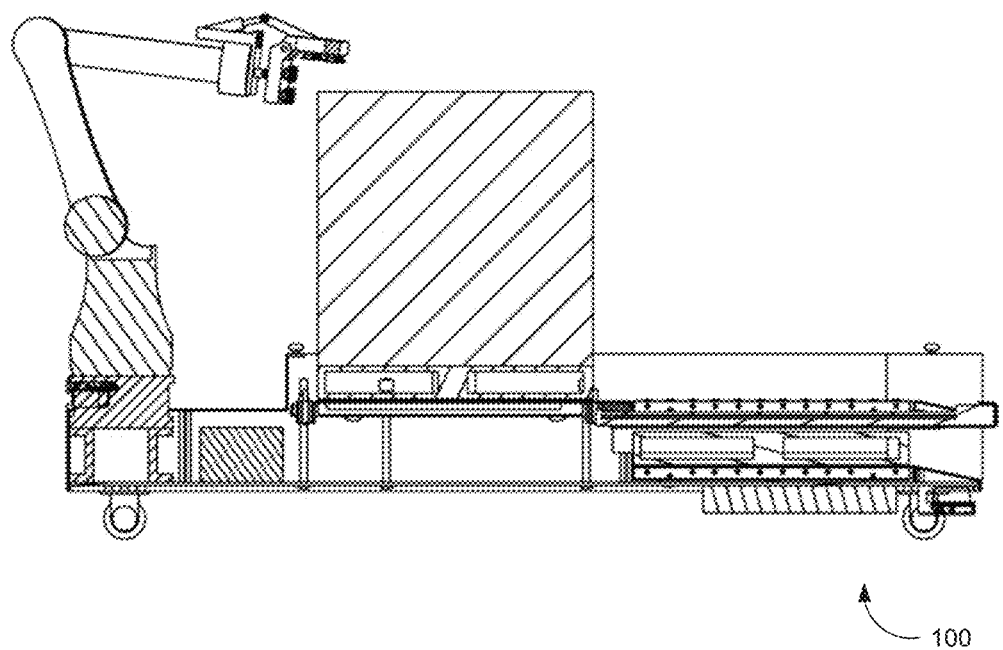
FIG. 3B depicts a full pallet loaded in top left station which is ready for pickup by the manipulator of the apparatus of FIG. 1, in accordance with an embodiment of the present disclosure.
Figure 3C:
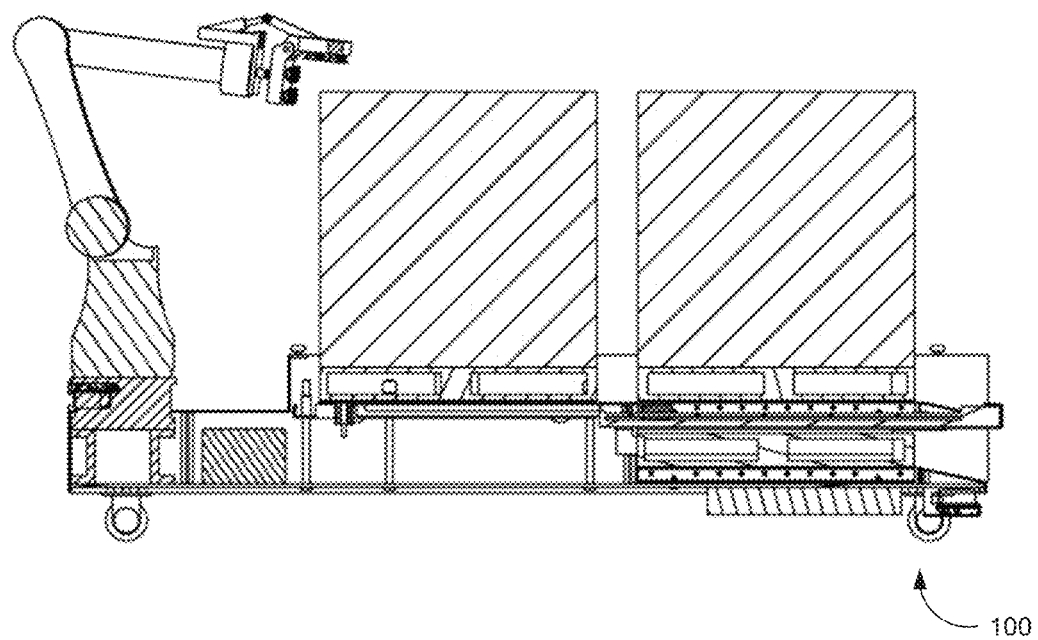
FIG. 3C depicts pallets loaded in top left and right station (e.g., the first area and the second area), in accordance with an embodiment of the present disclosure.

FIGS. 3A through 3H, with reference to FIGS. 1 through 2C, depict various pallet loading operation stages and manipulating of objects to and from pallets using the apparatus 100 of FIG. 1, in accordance with an embodiment of the present disclosure. More specifically, FIG. 3A depicts a full pallet loaded in top right station, and an empty pallet to be unloaded in bottom right position, in accordance with an embodiment of the present disclosure. FIG. 3B depicts a full pallet loaded in top left station which is ready for pickup by the manipulator 110 of the apparatus of FIG. 1, in accordance with an embodiment of the present disclosure. The full pallet loaded in top right station is moved by the linear slider 106 wherein the first double sided piston and the second double sided piston (also referred as 'double sided cylinders') lock the full pallet which then slides from the first area (top right position) to the second area (top left position). In one embodiment of the present disclosure, the first area and the second area are referred as (i) a pallet loading or unloading area or (ii) an object manipulating area comprised in a pallet. When the pallet is moved from top right position (e.g., say first area), then another pallet can occupy this area. This makes the apparatus capable of holding multi pallets at a time and the pallets may be moved to the top left position (e.g., second area) for manipulation of objects comprised in the pallet. The pallets movement may happen in sequential manner depending upon whether the second area is empty and ready for occupying a next pallet. FIG. 3C, with reference to FIGS. 1 through 3B, depicts pallets loaded in top left and right station (e.g., the first area and the second area), in accordance with an embodiment of the present disclosure. More specifically, in FIG. 3C, the pallet on the left side is ready for pickup by the manipulator and the pallet on the right side is loaded and ready for next cycle. In other words, when the first pallet is loaded and moved from the first area to the second area, a second pallet may be loaded as depicted in FIG. 3C.

Figure 3D:
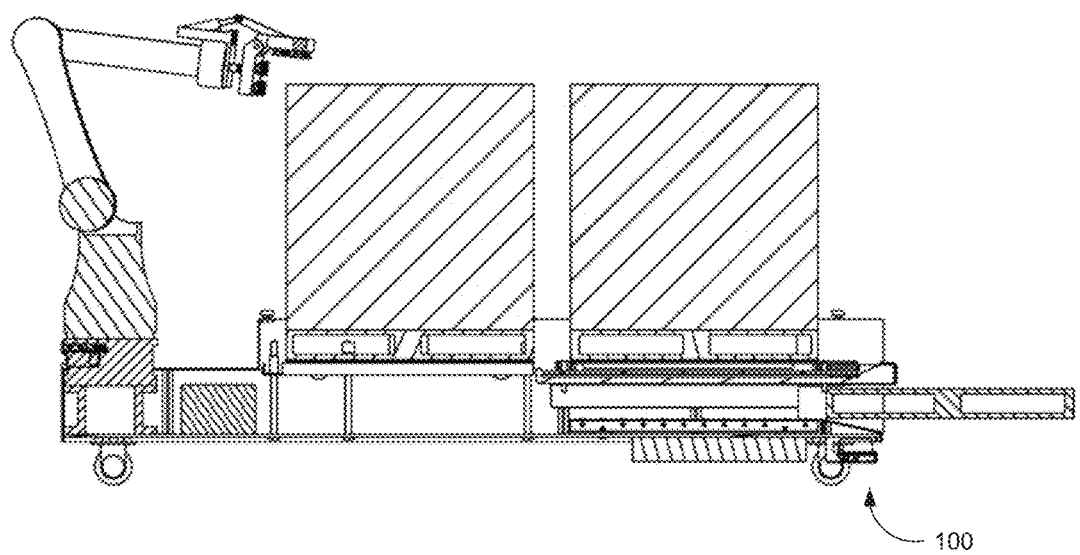
FIG. 3D depicts full pallet load in top left and right station and an empty pallet which is moved from bottom left station to top bottom right station and then pushed towards an exit area, in accordance with an example embodiment of the present disclosure.

FIG. 3D, with reference to FIGS. 1 through 3C, depicts full pallet load in top left and right station and an empty pallet which is moved from bottom left station to top bottom right station and then pushed towards an exit area, in accordance with an example embodiment of the present disclosure. As mentioned earlier, the top ramp 116A and the bottom ramp 116B are positioned at the bottom surface of the mobile base 102 such that the top ramp 116A and the bottom ramp 116B serve an exit for an empty pallet. In other words, when the first pallet is empty, the first pallet is indexed to a bottom layer of the mobile base 102 and the second pallet is moved to the second area, using a first piston pin of the first double sided piston and a second piston pin of the second double sided piston. A third pallet with objects is then loaded on the first area as depicted in FIG. 3C. The above description is better understood by way of example scenarios (e.g., loading, unloading, and exiting of empty pallets) depicted in FIGS. 3E through 3H.

Figure 3E:
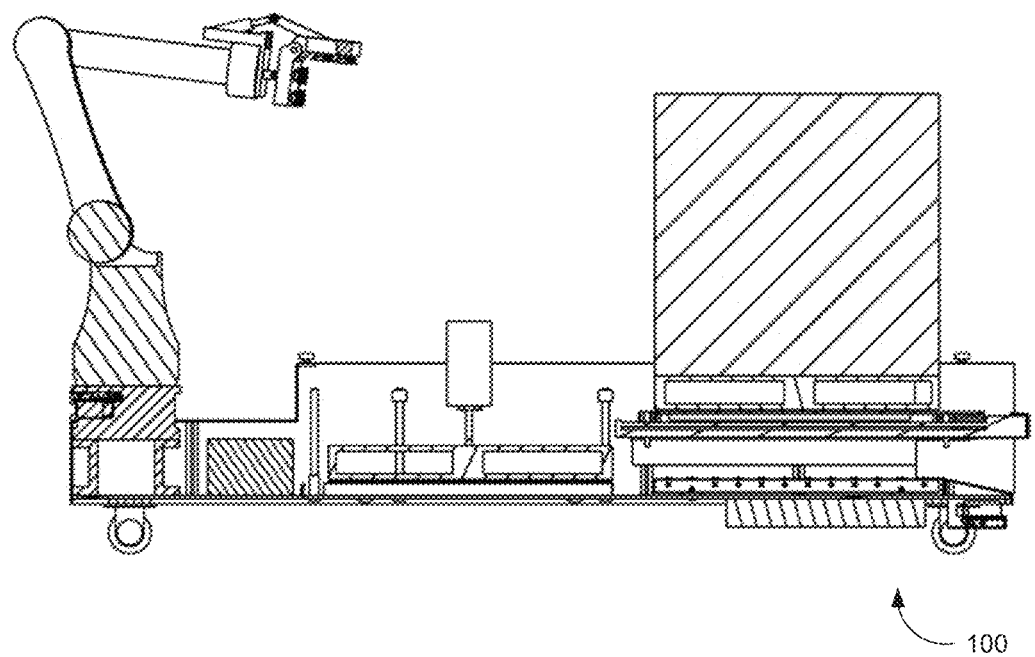
FIG. 3E depicts a pallet being unloaded from the second area of a top left station and another pallet loaded in the first area which is ready for movement from the top right station to the top left station, in accordance with an embodiment of the present disclosure.

FIG. 3E, with reference to FIGS. 1 through 3D, depicts a pallet being unloaded from the second area of a top left station and another pallet loaded in the first area which is ready for movement from the top right station to the top left station, in accordance with an embodiment of the present disclosure.

Figure 3F:
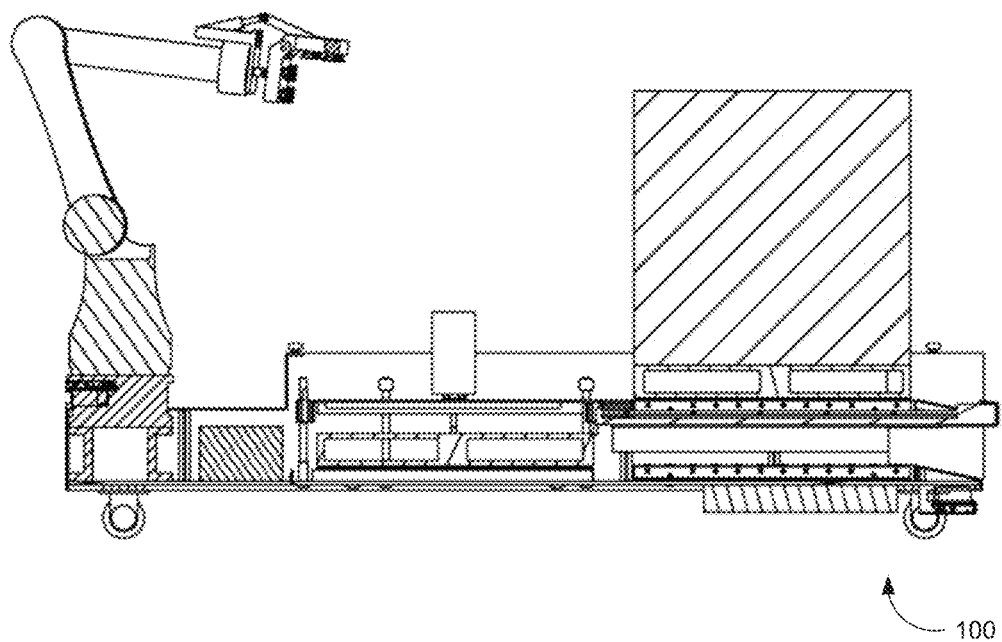
FIG. 3F depicts a second pallet being loaded in the top right station and an empty pallet which is moved from top position to bottom position of the mobile base 102, in accordance with an embodiment of the present disclosure.

FIG. 3F, with reference to FIGS. 1 through 3E, depicts a second pallet being loaded in the top right station and an empty pallet which is moved from top position to bottom position of the mobile base 102, in accordance with an embodiment of the present disclosure.

Figure 3G:
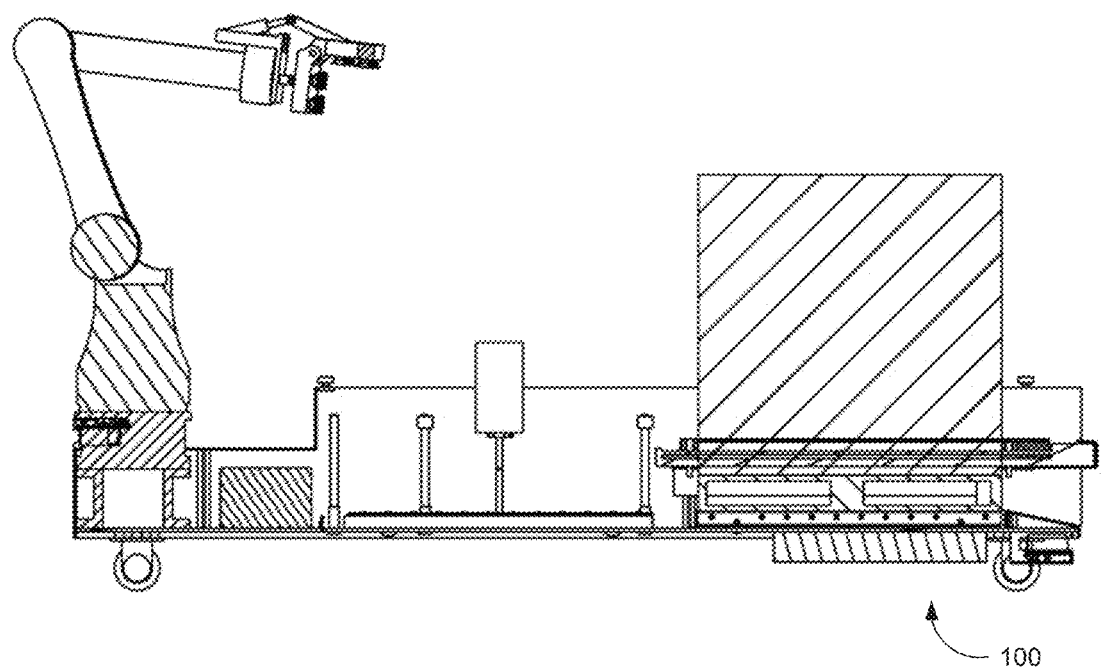
FIG. 3G depicts an empty pallet being moved from a bottom left of the top right station to bottom right of the top left station and then pushed towards the exit area, in accordance with an embodiment of the present disclosure.

FIG. 3G, with reference to FIGS. 1 through 3F, depicts an empty pallet being moved from a bottom left of the top right station to bottom right of the top left station and then pushed towards the exit area, in accordance with an embodiment of the present disclosure.

Figure 3H:
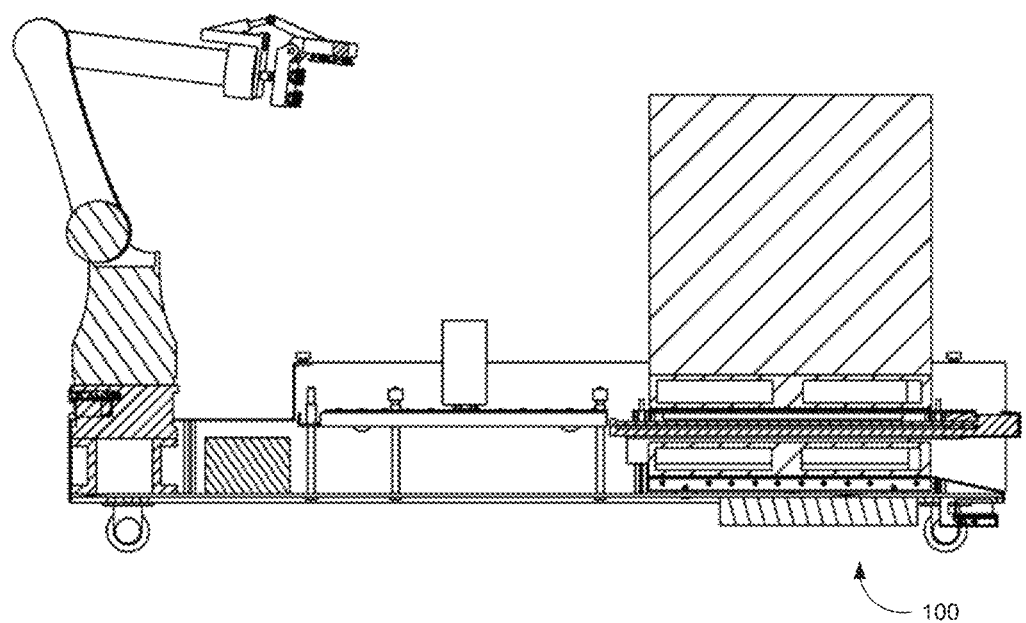
FIG. 3H depicts a movement of a pallet from the top right station to the top left station and ready for manipulation of objects from the pallet, in accordance with an embodiment of the present disclosure.

FIG. 3H, with reference to FIGS. 1 through 3G, depicts a movement of a pallet from the top right station to the top left station and ready for manipulation of objects from the pallet, in accordance with an embodiment of the present disclosure.

Figure 4A:
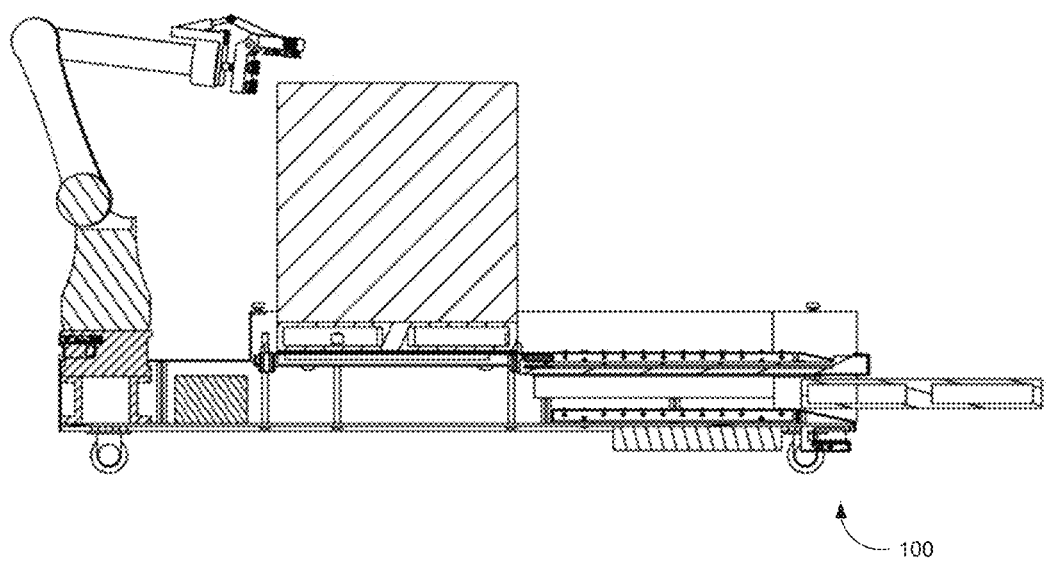
FIG. 4A depicts a full pallet loaded in the top left station and an empty pallet to be loaded in the bottom left position, in accordance with an embodiment of the present disclosure.
Figure 4B:
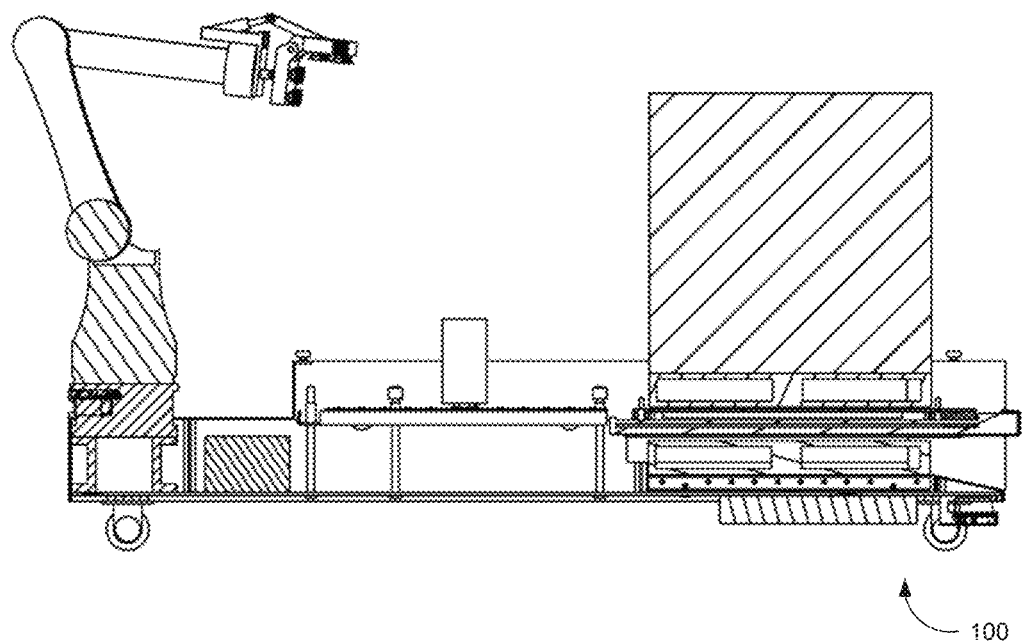
FIG. 4B depicts a full pallet loaded in right top station that is ready for pickup to unload objects comprised therein, in accordance with an embodiment of the present disclosure.
Figure 4C:
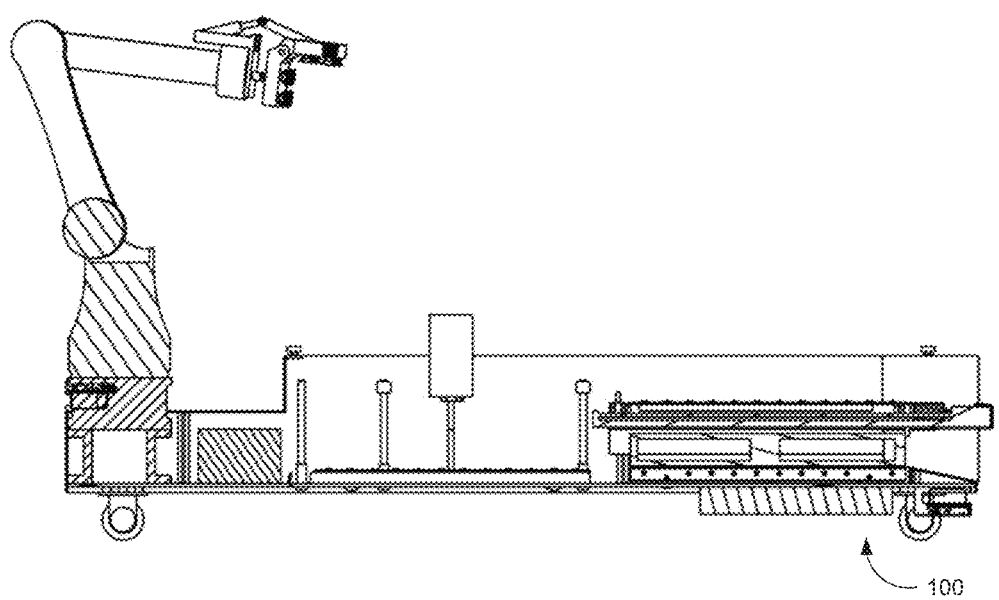
FIG. 4C depicts a full pallet unloaded from the top right station of the apparatus of FIG. 1, in accordance with an embodiment of the present disclosure.
Figure 4D:
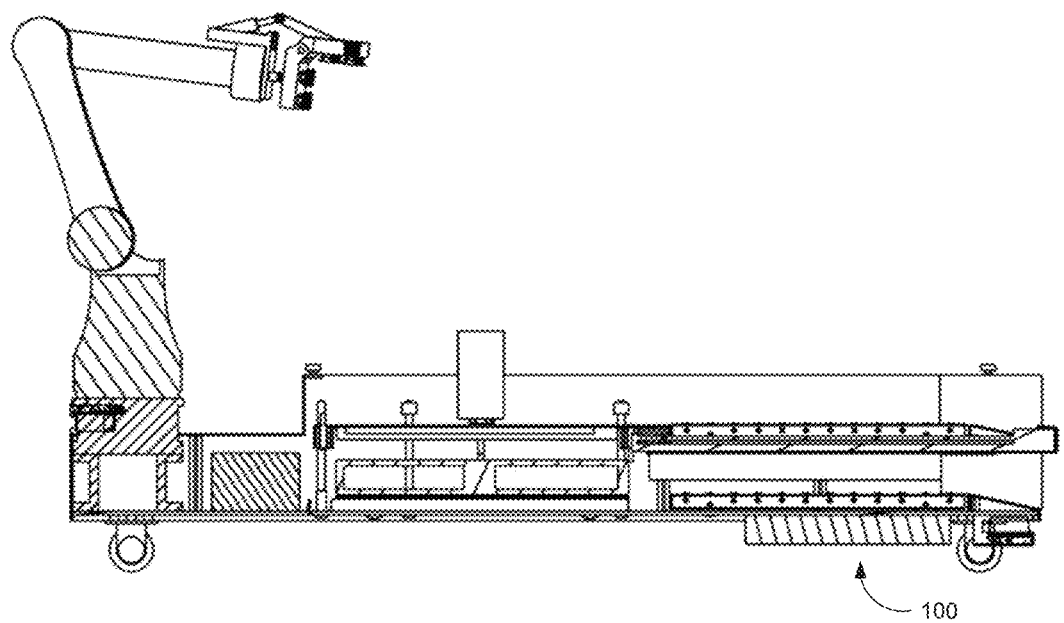
FIG. 4D depicts an empty pallet loaded from the bottom right station to the bottom left station of the apparatus of FIG. 1, in accordance with an embodiment of the present disclosure.
Figure 4E:
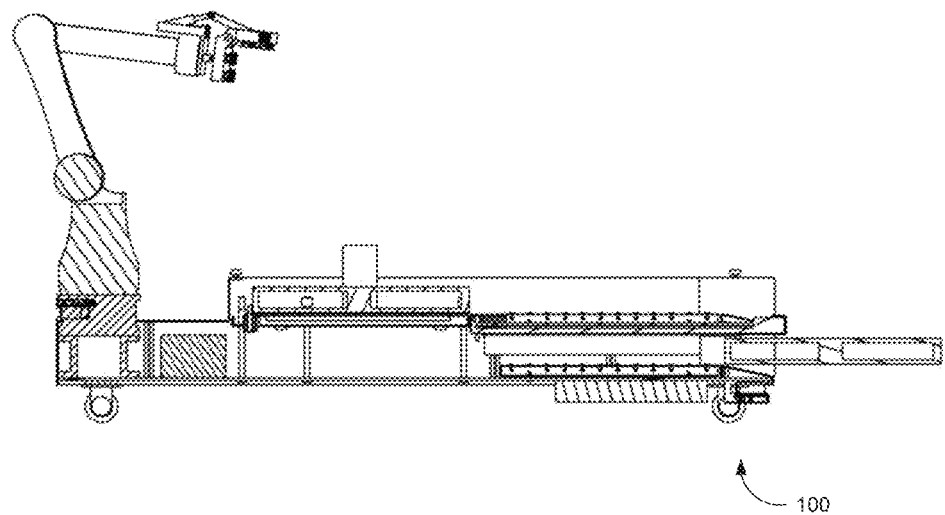
FIG. 4E depicts an empty pallet being moved from bottom left station to the top left station of the apparatus of FIG. 1, in accordance with an embodiment of the present disclosure.
Figure 4F:
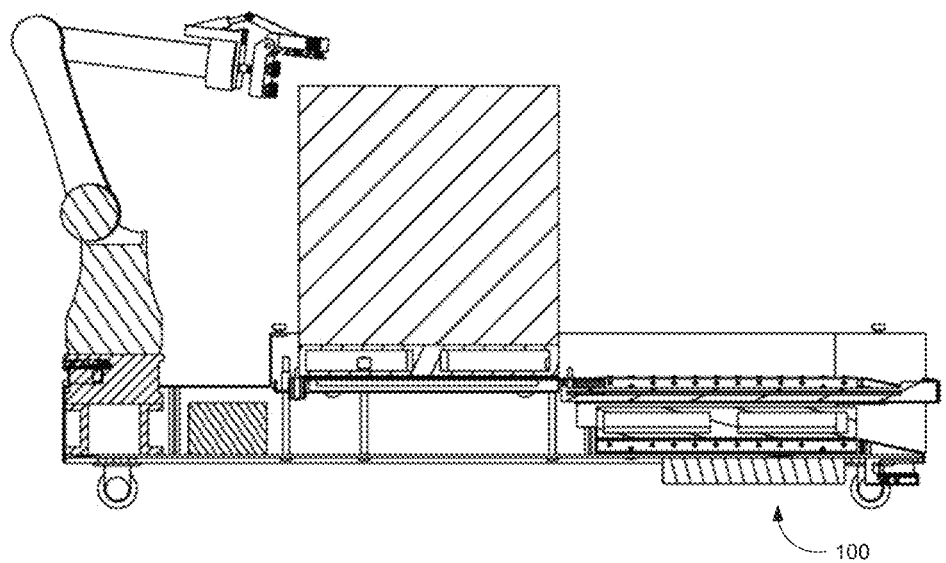
FIG. 4F depicts a pallet loaded in the top left station and is ready to slide to the top right station, in accordance with an embodiment of the present disclosure.
Figure 4G:
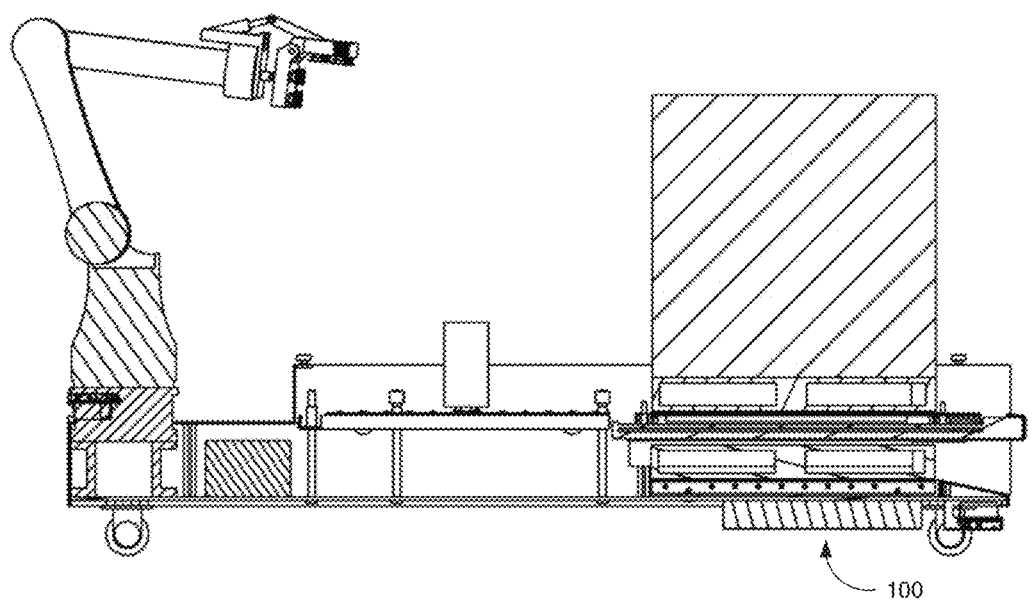
FIG. 4G depicts a loaded pallet at the top right station ready for unloading objects comprised therein, in accordance with an embodiment of the present disclosure.
Figure 4H:
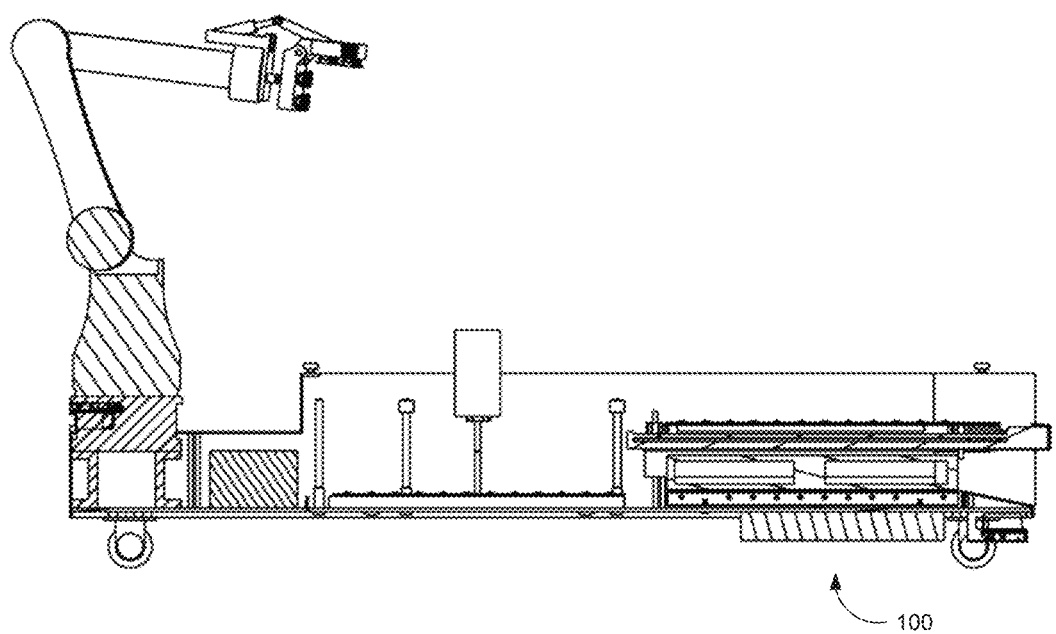
FIG. 4H depicts an unloaded scenario wherein a loaded pallet from the top right station is unloaded, in accordance with an embodiment of the present disclosure.
Figure 4I:
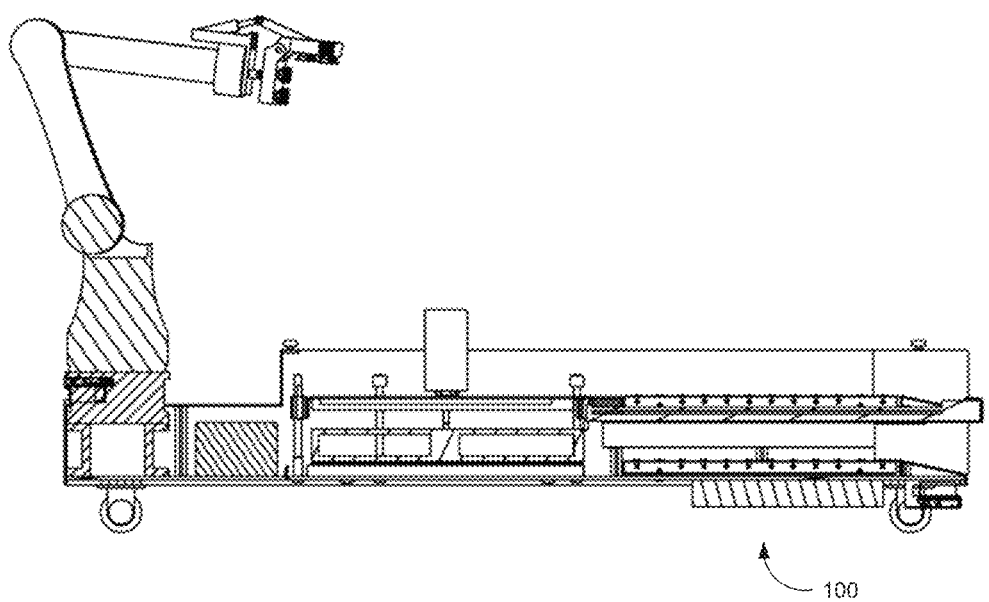
FIG. 4I depicts loading of an empty pallet in the bottom left station from the bottom right station, in accordance with an embodiment of the present disclosure.
Figure 4J:
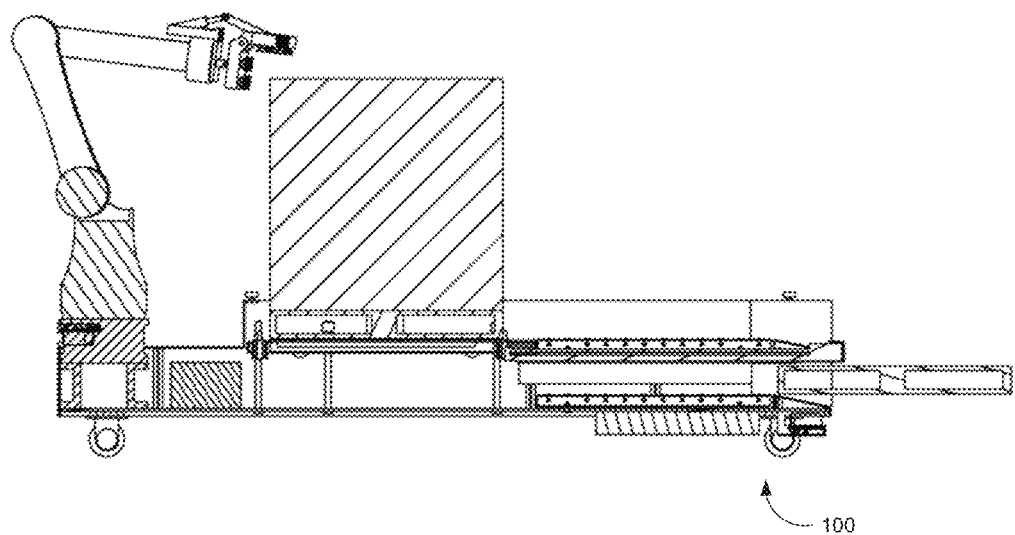
FIG. 4J depicts an empty pallet being loaded in the top left station and new empty pallet is ready for loading, in accordance with an embodiment of the present disclosure.

FIGS. 4A through 4J, with reference to FIGS. 1 through 3H, depict various pallet unloading operation stages and manipulating of objects to and from pallets using the apparatus 100 of FIG. 1, in accordance with an embodiment of the present disclosure. More specifically, FIG. 4A depicts a full pallet loaded in the top left station and an empty pallet to be loaded in the bottom left position, in accordance with an embodiment of the present disclosure. FIG. 4B depicts a full pallet loaded in right top station that is ready for pickup to unload objects comprised therein, in accordance with an embodiment of the present disclosure. FIG. 4C depicts a full pallet unloaded from the top right station of the apparatus 100 of FIG. 1, in accordance with an embodiment of the present disclosure. FIG. 4D depicts an empty pallet loaded from the bottom right station to the bottom left station of the apparatus 100 of FIG. 1, in accordance with an embodiment of the present disclosure. FIG. 4E depicts an empty pallet being moved from bottom left station to the top left station of the apparatus 100 of FIG. 1, in accordance with an embodiment of the present disclosure. FIG. 4F depicts a pallet loaded in the top left station and is ready to slide to the top right station, in accordance with an embodiment of the present disclosure. FIG. 4G depicts a loaded pallet at the top right station ready for unloading objects comprised therein, in accordance with an embodiment of the present disclosure. FIG. 4H depicts an unloaded scenario wherein a loaded pallet from the top right station is unloaded, in accordance with an embodiment of the present disclosure. FIG. 4I depicts loading of an empty pallet in the bottom left station from the bottom right station, in accordance with an embodiment of the present disclosure. FIG. 4J depicts an empty pallet being loaded in the top left station and new empty pallet is ready for loading, in accordance with an embodiment of the present disclosure.

Figure 5:
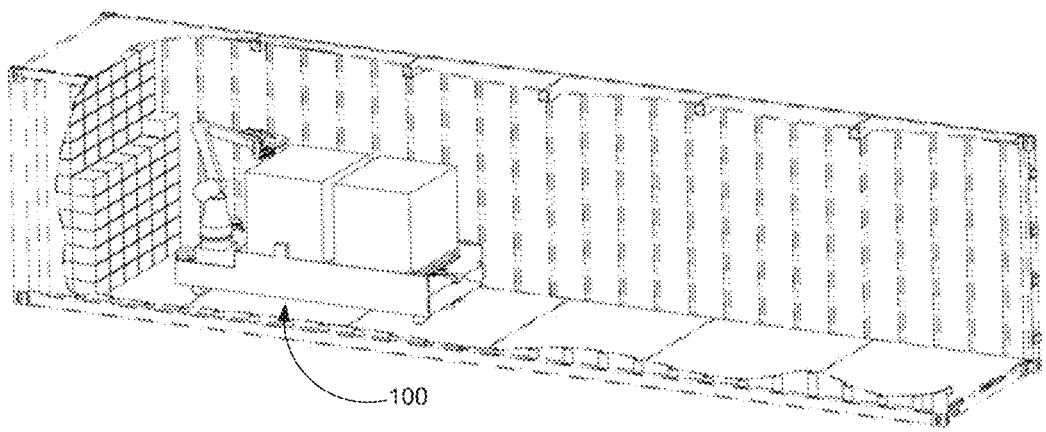
FIG. 5 depicts an application scenario illustrating an implementation of the apparatus of FIGS. 1 through 4J, in accordance with an embodiment of the present disclosure.

FIG. 5, with reference to FIGS. 1 through 4J, depicts an application scenario illustrating an implementation of the apparatus 100 of FIGS. 1 through 4J, in accordance with an embodiment of the present disclosure. More specifically, FIG. 5 depicts the apparatus 100 being comprised in a container wherein pallets are loaded in the first area and the second area for manipulation of objects comprises therein, by the manipulator 110 of the apparatus of FIG. 1, in accordance with an embodiment of the present disclosure.

Figure 6:
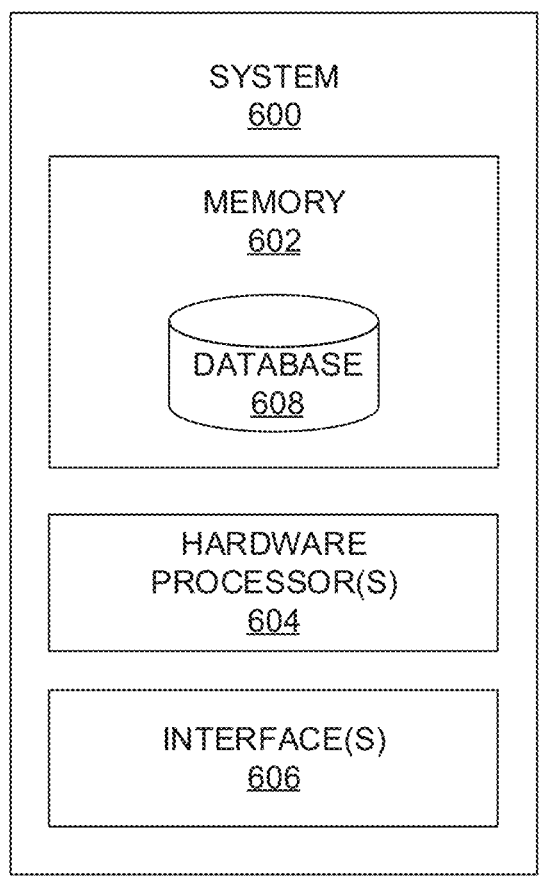
FIG. 6 depicts a system for capturing information for manipulation of objects comprised in pallets, using the apparatus of FIG. 1, in accordance with an embodiment of the present disclosure.

FIG. 6, with reference to FIGS. 1 through 5, depicts a system 600 for capturing information for manipulation of objects comprised in pallets, using the apparatus 100 of FIG. 1, in accordance with an embodiment of the present disclosure. In an embodiment, the system 600 includes one or more hardware processors 604, communication interface device(s) or input/output (I/O) interface(s) 606 (also referred as interface(s)), and one or more data storage devices or memory 602 operatively coupled to the one or more hardware processors 604. The one or more processors 604 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 600 can be implemented in a variety of computing systems, such as laptop computers, notebooks, hand-held devices, workstations, mainframe computers, servers, a network cloud, robot, and the like.

The I/O interface device(s) 606 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 602 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 608 is comprised in the memory 602, wherein the database 608 comprises information, for example, object shape, object size, object orientation, object type (e.g., deformable or non-deformable) and the like. The information stored in the database 608 may further comprise grasping points estimated by the apparatus 100 or the hardware processors 604. The information stored in the database 608 may further comprise amount of expansion and collapsing of the plurality of grasping fingers. The information stored in the database 608 may further comprise how much amount of suction should be provided into the suction cups for grasping the object, and the like. The memory 602 further comprises (or may further comprise) information pertaining to input(s)/output(s) of each step performed by the systems and methods of the present disclosure. In other words, input(s) fed at each step and output(s) generated at each step are comprised in the memory 602 and can be utilized in further processing and analysis.

Figure 7:
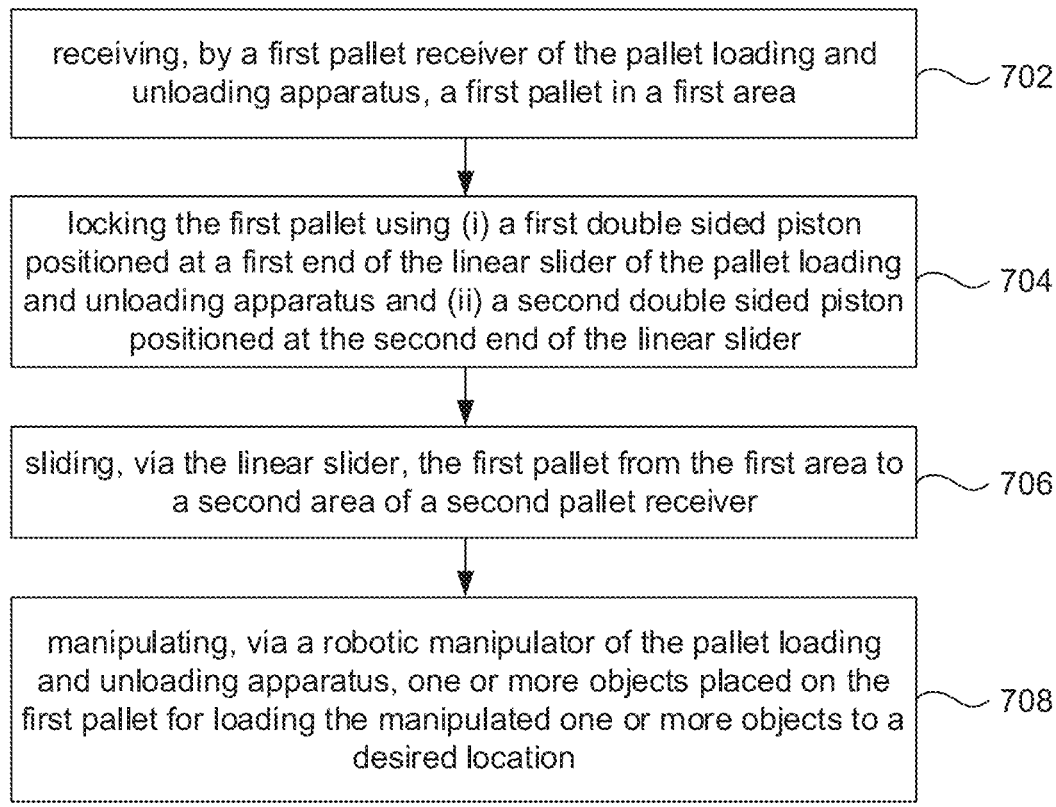
FIG. 7 is an exemplary flow chart illustrating a method for manipulating objects comprised in pallets positioned on the first area and the second area of the apparatus of FIG. 1, in accordance with an embodiment of the present disclosure.

FIG. 7, with reference to FIGS. 1 through 6, is an exemplary flow chart illustrating a method for manipulating objects comprised in pallets positioned on the first area and the second area of the apparatus 100 of FIG. 1, in accordance with an embodiment of the present disclosure. The steps of the method of the present disclosure will now be explained with reference to components of the system 600 of FIG. 6, FIGS. 1 through 5, and the flow diagram as depicted in FIG. 7. In an embodiment, at step 702 of the present disclosure, a first pallet is received by the first pallet receiver 104A of the pallet loading and unloading apparatus 100, in a first area. In an embodiment, at step 704 of the present disclosure, the first pallet is locked using (i) a first double sided piston positioned at a first end of the linear slider 106 of the pallet loading and unloading apparatus 100 and (ii) a second double sided piston positioned at the second end of the linear slider 106. In an embodiment, at step 706 of the present disclosure, the linear slider is actuated to slide the first pallet from the first area to a second area of the second pallet receiver 104B. In an embodiment, at step 708 of the present disclosure, one or more objects placed on the first pallet are manipulating, via the robotic manipulator 110 of the pallet loading and unloading apparatus 100, for loading the manipulated one or more objects to a desired location. The robotic manipulator 100 is in communication with plurality of sensors 108A-N for (i) navigating to a desired location and manipulating one or more objects placed inside the second pallet and (ii) loading the manipulated one or more objects to another desired location. The method of FIG. 7 can be realized and better understood by way of exemplary FIGS. 3A through 3H. In an embodiment of the present disclosure, the one or more objects are manipulated by the robotic manipulator 110 of the pallet loading and unloading apparatus 100 based on navigation information and manipulating information obtained from a plurality of sensors (e.g., sensors 108A-N) mounted on the pallet loading and unloading apparatus. Manipulating information may be captured by other sensors (or the same sensors 108A-N). Sensors capturing manipulating information may be vision sensors that comprise a 2D sensor, a 3D sensor or a combination of 2D and 3D sensors (3D+2D). These sensors may be comprised in (or are integrated within) the apparatus 100 which captures the size, shape, location, orientation and type of packaging of the objects from the pallets. In the present disclosure, the one or more vision sensors are not visible and not depicted in the FIGS. The vision sensors may also be referred as an image capturing device or the electronic device and may further be interchangeably used hereinafter. In an embodiment of the present disclosure, the vision sensor is an electronic device that captures information of at least one object to be grasped/manipulated. The captured/manipulating information comprises size, shape, surface, and an orientation of objects and pallet(s) and the like. Further, the apparatus 100 is backed by artificial intelligence system (e.g., one or more hardware processors 704) which decides the type of grasping to be used, dimension of the object and other critical parameters with this information.

Once the first pallet is slid (or moved) to the second area, the first pallet receiver 104A is configured to accommodate a second pallet in the first area. The first pallet comprising objects are manipulated for loading to a desired location. Once the first pallet is empty, the first pallet is automatically indexed to a bottom layer of the mobile base and the second pallet is moved/slide from the first area to the second area, using a first piston pin of the first double sided cylinder 140A (first double sided cylinder is also referred as first double sided piston 140A) and a second piston pin of the second double sided cylinder 140B (second double sided cylinder is also referred as second double sided piston 140B). Further, the apparatus 100 dynamically move from a first position to a second position by a specific length. The length information may be obtained from a loading planner that is comprised in the apparatus 100 and serves as a logic. The loading planner determines how much space is occupied by the objects in the location. This space determination is performed based on information captured by the sensors 108A-N (or by other sensors which are either integrated within the apparatus 100). There could be external sensors transmitting this information of space determination wherein this information gets utilized by the apparatus 100 to dynamically move from the first position to the second position within the desired location based on space occupied by the one or more objects being manipulated.

Figure 8:
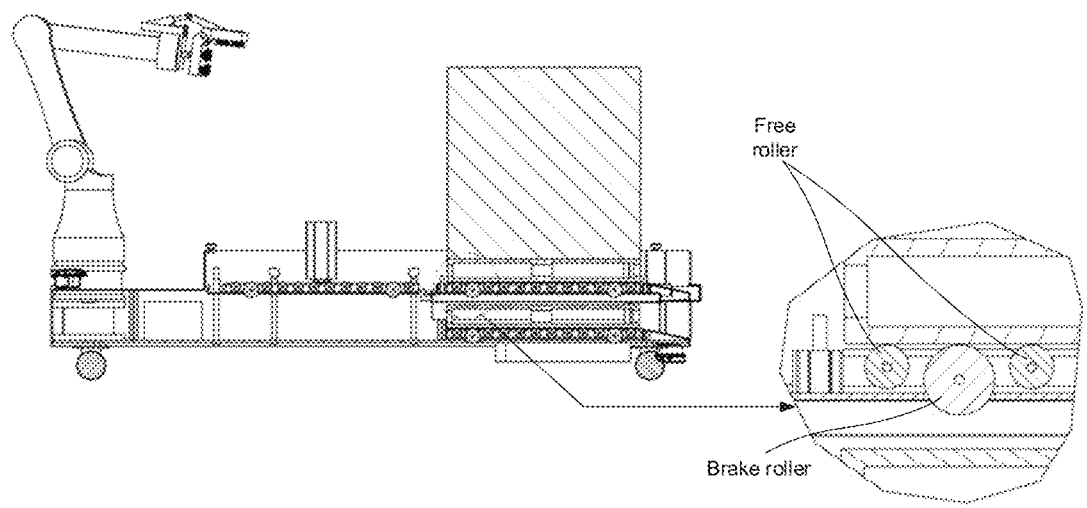
FIG. 8 depicts the apparatus of FIG. 1 illustrating detailed view of a free roller and a brake roller, in accordance with an embodiment of the present disclosure.

FIG. 8, with reference to FIGS. 1 through 7, depicts the apparatus 100 illustrating detailed view of a free roller and a brake roller, in accordance with an embodiment of the present disclosure.

Figure 9:
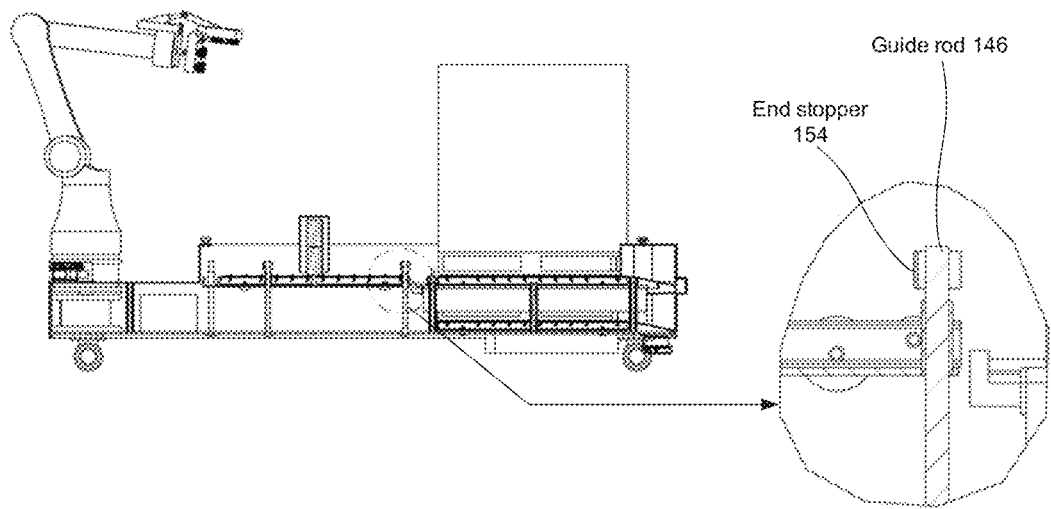
FIG. 9 depicts the apparatus of FIG. 1 illustrating detailed view indicative of position of an end stopper and guide rods of the apparatus of FIG. 1, in accordance with an embodiment of the present disclosure.

FIG. 9, with reference to FIGS. 1 through 8, depicts the apparatus 100 of FIG. 1 illustrating detailed view indicative of position of the end stopper 154 and the guide rod 146A-N of the apparatus 100 of FIG. 1, in accordance with an embodiment of the present disclosure.

The apparatus 100 is connected to a robot or an external system via one or more coupling systems (e.g., connectors as known in the art) or input/output interfaces as known in the art. The external system or the robot comprises (or may comprise) the components as shown in FIG. 6, wherein the robot or external system receives information being captured by the electronic device. In an embodiment, the electronic device may be comprised in the external system or the robot. In another embodiment, the system 600 may be comprised in the apparatus 100. The same information is processed by the one or more hardware processors 604 which estimate movement of a plurality of fingers and suction cups in at least one direction. The same information is processed by the one or more hardware processors that estimate one or more grasping points, and an amount of collapsing and expansion of the plurality of grasping fingers, based on the captured information. The robot or external system may be connected to the apparatus 100 and wherein the robot or external system may be operated in such a way that the apparatus 100 is monitored/controlled to grasp object of interest firmly and manipulated accordingly. In an embodiment, the system 100 may be comprised within (or integrated inside) the apparatus 100. In another embodiment, the system 600 may be externally connected to the apparatus 100 via one or more interfaces/coupling mechanism/connectivity means, etc.

Embodiments of the present disclosure provide a pallet loading and unloading apparatus and method, wherein pallet(s) from a forklift jack is dropped on the linear slider assembly wherein the pallet is the top ramp enables movement of the pallet on to the first area with help of slider pins and the pallet is pushed from front section (L-channel assembly) to the back section (dual indexing plate assembly). The free rollers give flexibility for the linear slider to slide freely on top. The manipulator 110 plays its role of palletizing and depalletizing at that section. If it is depalletizing, then the empty pallet (which is on dual indexing plate) is slid (or moved/slide) down using actuators and guided pins and then pushed back to bottom rollers which is below the L-channel slider assembly and finally pushed out towards the bottom ramp towards exit. The expressions slid and slide may be interchangeably used hereinafter.

Further, unlike conventional apparatus which fail to address palletizing and depalletizing, the apparatus 100 of the present disclosure is capable of holding up to 2 pallets at a time in which first pallet is used for loading/unloading and is accessible to a manipulator. Once the first pallet is completed, there is mechanical system under the pallet, which indexes the empty pallet down and using sliding piston it pushes the pallet out of the apparatus through a pallet exit area. The pallet which is loaded from the manipulator area is slid/moved to the loading area which allows operator to load another pallet, and this cycle continues until the palletizing and depalletizing is done with rows packing. In this whole process, the apparatus 100 moves backwards on each row completion. In other words, the empty palette which was pushed through the manipulating area is slid/moved/indexed back outside to the pallet exit area with the same double sided pistons which used to lock the palette and pushes out of the palletizing/depalletizing zone (e.g., say a truck container/empty space, or container and the like). All these are repetitive process until the row inside the truck container is done. Once the loading of one row is done, the apparatus moves to a position by a length which is defined by the loading planner and the process starts again for filling the new row. The apparatus 100 works on reverse basis where unloading happens, in which empty pallets are loaded at the bottom, and the linear slider slides and indexes the pallet to the loading area to start palletizing with the manipulator. Once the pallet gets completed on packing, they are slide to the manipulating/loading area.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. An apparatus for automated objects manipulation to and from pallets, the apparatus comprising:
a mobile base;
a plurality of pallet receivers mounted on one end of the mobile base, wherein each of the plurality of pallet receivers are configured to accommodate a pallet;
a linear slider having a first double sided piston at a first end and a second double sided piston at a second end of the linear slider, wherein the first end and the second end of the linear slider are opposite to each other, wherein a first pallet receiver accommodates a first pallet in a first area, wherein the first pallet is locked by the linear slider, the first double sided piston and the second double sided piston, and wherein the linear slider is configured to slide the first pallet from the first area to a second area of a second pallet receiver such that a second pallet is configured to occupy the first area;
a plurality of sensors mounted on the mobile base; and
a robotic manipulator mounted on other end of the mobile base, wherein the robotic manipulator is in communication with the plurality of sensors for (i) navigating to a desired position and manipulating one or more objects placed on the first pallet and (ii) loading the manipulated one or more objects to a desired location, and wherein when the first pallet is empty, the first pallet is indexed to a bottom layer of the mobile base and the second pallet is moved to the second area, using a first piston pin of the first double sided piston and a second piston pin of the second double sided piston of the linear slider.

2. The apparatus as claimed in claim 1, wherein the robotic manipulator is in communication with plurality of sensors for (i) navigating to a desired location and manipulating one or more objects placed inside the second pallet and (ii) loading the manipulated one or more objects to another desired location.

3. The apparatus as claimed in claim 1, wherein the apparatus is configured to dynamically move from a first position to a second position within the desired location based on space occupied by the one or more objects being manipulated.

4. The apparatus as claimed in claim 3, wherein the apparatus dynamically moves from the first position to the second position by a specific length obtained from a loading planner.

5. The apparatus as claimed in claim 1, wherein the first area and the second area are one of (i) a pallet loading or unloading area or (ii) an object manipulating area comprised in a pallet.

6. A method for manipulating objects by a pallet loading and unloading apparatus, the method comprising:
receiving, by a first pallet receiver of the pallet loading and unloading apparatus, a first pallet in a first area;
locking, the first pallet, using (i) a first double sided piston positioned at a first end of a linear slider of the pallet loading and unloading apparatus and (ii) a second double sided piston positioned at a second end of the linear slider, wherein the first end and the second end of the linear slider are opposite to each other;
sliding, via the linear slider, the first pallet from the first area to a second area of a second pallet receiver; and
manipulating, via a robotic manipulator of the pallet loading and unloading apparatus, one or more objects placed on the first pallet for loading the manipulated one or more objects to a desired location.

7. The method as claimed in claim 6, wherein the one or more objects are manipulated by the robotic manipulator of the pallet loading and unloading apparatus based on navigation information and manipulating information obtained from a plurality of sensors mounted on the pallet loading and unloading apparatus.

8. The method as claimed in claim 6, wherein when the first pallet is slid to the second area, the first pallet receiver is configured to accommodate a second pallet in the first area.

9. The method as claimed in claim 8, wherein the robotic manipulator is in communication with plurality of sensors for (i) navigating to a desired location and manipulating one or more objects placed inside the second pallet and (ii) loading the manipulated one or more objects to a desired location.

10. The method as claimed in claim 6, further comprising upon determining that the first pallet is empty, automatically indexing the first pallet to a bottom layer of the mobile base and sliding the second pallet from the first area to the second area, using a first piston pin of the first double sided piston and a second piston pin of the second double sided piston of the linear slider.

11. The method as claimed in claim 6, further comprising dynamically moving of the pallet loading and unloading apparatus, from a first position to a second position by a specific length obtained from a loading planner, wherein the pallet loading and unloading apparatus dynamically moves from the first position to the second position within the desired location based on space occupied by the one or more objects being manipulated.

* * * * *